Dec. 13, 1932.   L. J. HOOLEY ET AL   1,891,159
MANUFACTURE OF AMIDES OF THE BENZENE, NAPHTHALENE, AND ACENAPHTHENE SERIES
Filed Aug. 31, 1928

L. J. Hooley and
J. Thomas
INVENTORS

By: Marks & Clerk
Attys.

Patented Dec. 13, 1932

1,891,159

UNITED STATES PATENT OFFICE

LEONARD JOSEPH HOOLEY AND JOHN THOMAS, OF GRANGEMOUTH, SCOTLAND, ASSIGNORS TO SCOTTISH DYES, LIMITED, OF GRANGEMOUTH, SCOTLAND

MANUFACTURE OF AMIDES OF THE BENZENE, NAPHTHALENE, AND ACENAPHTHENE SERIES

Application filed August 31, 1928, Serial No. 303,314, and in Great Britain January 3, 1928.

This invention relates to the manufacture and production of derivatives of the benzene naphthalene and acenaphthene series.

The invention consists in methods for the manufacture of derivatives of the benzene, naphthalene and acenaphthene series, which comprise the submission of sulphonated aromatic amines of these series one or more times to the processes of condensing with a nitro acidyl chloride and reducing the product to the corresponding amine after each condensation and then condensing the product thus obtained with an aliphatic or aromatic acidyl chloride which does not contain a nitro group.

The invention also consists in the condensation of 1-naphthylamine-4.6.8-trisulphonic acid with para-nitro-benzoyl-chloride followed by reduction and treatment with benzoyl chloride.

The invention also consists in the condensation of 1-naphthylamine-4.6.8-trisulphonic acid with para-nitro-benzoyl-chloride followed by reduction, this operation being repeated three times until four benzoyl groups have been introduced after which the resulting compound is condensed with benzoyl chloride.

The invention also consists in a modification of the process of the preceding paragraph according to which the para-nitrobenzoyl-chloride is used twice and the benzoyl chloride is employed once.

The invention also consists in the condensation of amino dihydroxy naphthalene sulphonic acid such as may be obtained substantially as described herein with para-nitrobenzoyl chloride followed by reduction of the nitro group and condensation with benzoyl chloride.

The invention also consists in new derivatives of the benzene and naphthalene series when made by processes as herein described or by the chemical equivalents of those processes.

Referring now to the diagrammatic drawing:—

Figure 1:
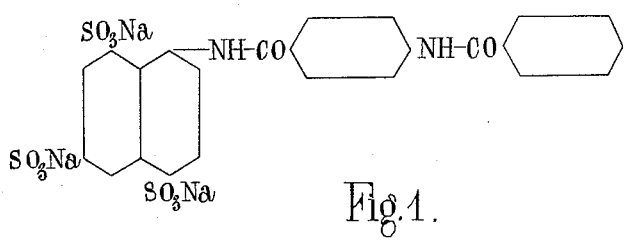
Figure 1 illustrates the product obtained by condensing 1-naphthylamine-4.6.8-trisulphonic acid with para-nitro-benzoyl-chloride followed by reduction and then by condensation with benzoyl chloride.

The following examples illustrate how the invention may be carried into effect references to parts being to parts by weight:—

Example 1

This is an example of the production of benzoyl-p-amino-benzoyl-p-amino - benzoyl - p-amino-benzoyl-p-amino-benzoyl-1-aminonaphthalene-4.6.8-trisulphonic acid as well as the following products which may be obtained intermediately, (a) p-amino-benzoyl-p-amino - benzoyl-p-amino-benzoyl-p-amino-benzoyl - 1 - amino - naphthalene-4.6.8-trisulphonic acid, (b) p-nitro-benzoyl-p-amino-benzoyl-p-amino - benzoyl - p - amino - benzoyl - 1 - amino-naphthalene-4.6.8-trisulphonic acid.

(c) p-amino-benzoyl-p-amino-benzoyl - p-amino - benzoyl-1-aminonaphthalene - 4.6.8 - trisulphonic acid, (d) p-nitro-benzoyl-p-amino-benzoyl - p - amino-benzoyl-1-aminonaphthalene - 4.6.8 - trisulphonic acid.

50 parts of 1-aminonaphthalene-4.6.8-trisulphonic acid are dissolved in 300 parts of water. The solution is made faintly alkaline, 30 parts of sodium acetate are added and the temperature raised to about 50–60° C. 30 parts of p-nitro-benzoyl chloride are then added in small portions at a time with vigorous stirring. The process of condensation may be followed by titrating with sodium nitrite. Small quantities of p-nitro-benzoyl-chloride may be added, if found necessary, and more alkali if the solution becomes acid. When condensation is completed the solution is made just acid to Congo red paper, allowed to cool and filtered.

The filtrate of p-nitro-benzoyl-1-amino-naphthalene-4.6.8-trisulphonic acid may then be reduced. As an example of a method of reduction the solution is boiled under reflux with 30 parts of iron, which has been cleaned with dilute acetic acid. A trace of acetic acid is also added to the filtrate. When reduction is completed, which can be found by titration of test portions with sodium nitrite, after removal of iron, the solution is made alkaline with caustic soda and filtered off. The residue containing the iron may be extracted with small quantities of warm water to remove all the amino body.

The p-amino-benzoyl-1-amino-naphthalene-4.6.8-trisulphonic acid in the filtrate is similarly condensed with p-nitro-benzoyl-chloride. When condensation is complete the solution is made slightly acid to Congo red paper and immediately filtered off. From the filtrate the p-nitro-benzoyl-p-amino-benzoyl-1-amino-naphthalene-4.6.8-trisulphonic acid may be salted out. This is then redissolved in water and reduced under similar conditions to the p-nitro-benzoyl-1-amino-naphthalene-4.6.8-trisulphonic acid. The resulting p-amino-benzoyl-p-amino-benzoyl-1 - amino-naphthalene-4.6.8-trisulphonic acid can then be salted out of solution or the solution used again for the next condensation.

The third condensation with p-nitro-benzoyl-chloride is carried out in a similar manner to the second, but when condensation is complete the solution is made acid to Congo red paper, salted, allowed to stand and then filtered. The residue is then dried and extracted with twenty times its weight of ether to remove any p-nitro benzoic acid or p-nitro-benzoyl-chloride present. A third reduction is carried out as before and the p-amino-benzoyl-p-amino-benzoyl-p-amino - benzoyl - 1 - amino-naphthalene - 4.6.8 - trisulphonic acid condensed again with p-nitro-benzoyl-chloride. This condensation product is isolated and extracted with ether, reduced and finally condensed with benzoyl chloride.

The resulting benzoyl-p-amino-benzoyl-p-amino-benzoyl-p-amino-benzoyl-p- a m i n o-benzoyl - 1 - amino-naphthalene - 4.6.8-trisulphonic acid can be most easily isolated by the method of acidifying and extracting with ether. If the substance is required as the tri-sodium salt it can be converted to this in a variety of ways, e. g. by dissolving in faintly alkaline solution and precipitating by salting out or crystallizing without the addition of acid.

Example 2

This is an example of the production of products from benzene-1-amino-2-methyl-4-sulphonic acid.

In this example 5 parts of benzene-1-amino-2-methyl-4-sulphonic acid are dissolved in 50 parts of water and the solution made slightly alkaline. 4 parts of sodium acetate are added, and then 4 parts of m-nitro-benzoyl chloride during ½ hour at 50–60° C. The product is allowed to stir for about ½ hour or longer until the condensation is completed. The solution is then made acid to Congo with hydrochloric acid, allowed to stand, and the precipitate filtered off. This is then dried and extracted with 100 parts of ether. The m-nitro-benzoyl-o-toluidine-sulphonic acid remains insoluble. This m-nitro-benzoyl-o-toluidine-sulphonic acid is reduced to the corresponding m-amino body by dissolving in 20 parts of water and reducing with iron and a trace of acetic acid. The solution thus obtained can be condensed again with m-nitro-benzoyl chloride. The resulting m-nitro-benzoyl-m-amino-benzoyl-o-toluidine-sulphonic acid will separate from the slightly alkaline solution after cooling and may be filtered off.

The moist suspension obtained in this filtration may be conveniently reduced in 50% spirit. 5 parts of the condensation product are put into 200 parts of 50% alcohol, made acid to litmus with acetic acid and then reduced with 3 parts of iron. The reduced solution of m-amino-benzoyl-m-amino-benzoyl-o-toluidine-sulphonic acid may be condensed again with m-nitro-benzoyl chloride, again reduced and finally condensed with benzoyl chloride. The latest stages of the process require to be done in more dilute solution owing to the decreasing solubility of the products.

Example 3

This is an example of a condensation involving several different nitro-acidyl chlorides.

According to this example a product is obtained from 1.8-aminonaphthol-3.6-disulphonic acid by condensing successively with p-nitro-benzoyl-chloride, m-nitro-benzoyl-chloride, p-methyl-m-nitro-benzoyl chloride, and benzoyl chloride with intermediate reduction. The various stages are carried out in a similar way to those described in Example 1 except that owing to the much smaller solubility of 1.8-aminonaphthol-3.6-disulphonic acid the various stages need to be done in greater volumes of solvent.

Example 4

This is an example of the condensation of a naphthol derivative.

According to this example amino-di-hydroxynaphthalene sulphonic acid is employed. This product may be obtained by the alkali fusion of 1.8-amino-naphthol-3.6-disulphonic acid, according to the process of D. R. P. 75,097.

According to one method 20 parts of the amino - di - hydroxy-naphthalene - sulphonic acid are dissolved in 100 parts of water, the solution neutralized if necessary with caustic soda and then 10 gms. of sodium acetate added. The temperature is raised to 65° C. and 10 parts of p-nitro-benzoyl-chloride gradually added during half an hour with good stirring. Stirring is continued for a further half hour at the same temperature and then tested to see whether the condensation is complete. If necessary, a little more p-nitro-benzoyl-chloride may be added and the condensation continued under the same conditions as before. When all, or substantially all the amino body has condensed, the solution is allowed to cool, made acid to Congo with hydrochloric acid, allowed to stand for a short time and then filtered. The residue is dried and then freed from any p-nitro-benzoic acid or p-nitro-benzoyl-chloride by extraction with ether. The resulting p-nitrobenzoyl derivative is then reduced. For this purpose 20 parts are dissolved in about 250 parts of water, a trace of acetic acid added and the solution then boiled with 15 parts of iron powder for about 3 hours. The solution is then allowed to cool and the p-amino-benzoyl derivative is separated from the iron in the usual way. It can be isolated from the solution if desired by salting out or the next stage carried out on the solution, for example, as obtained in the previous reduction, and, after neutralization if necessary 10 parts of sodium acetate are added, the temperature raised to 65° C. and then 10 parts of benzoyl chloride run in over half an hour and the condensation carried out in the usual manner, additional quantities of benzoyl chloride being added if necessary. When condensation is complete the solution is acidified with hydrochloric acid, filtered and extracted with ether as previously. The extracted product may be further purified if desired from water.

The resulting product is a benzoyl-p-amino-benzoyl derivative. Instead of condensing once with p-nitro-benzoyl-chloride and once with benzoyl chloride, two condensations with the p-nitro-benzoyl-chloride may be carried out and one with benzoyl chloride.

*Example 5*

This is an example of the use of an acid chloride other than a carboxylic acid chloride condensation being effected with p-toluene-sulphonic chloride.

As a specific example of the condensation of this body we take p-amino-benzoyl-p-amino-benzoyl-p-amino-benzoyl-1-amino-naphthalene-3.6.8-trisulphonic acid. One part of the amino body is dissolved in 15 parts of water, made neutral to litmus, and the solution then stirred with p-toluene-sulphochloride, at about 50° C. until titration with sodium nitrite shews the absence of any amino body.

*General*

The invention is not limited to the above examples.

A typical simple example according to the present invention may be taken as that where 1-naphthylamine-4.6.8-trisulphonic acid is condensed with para-nitro-benzoyl chloride and reduced and then condensed with benzoyl chloride, the resulting product of which process may conveniently be indicated as shewn in Figure 1.

Figure 2:
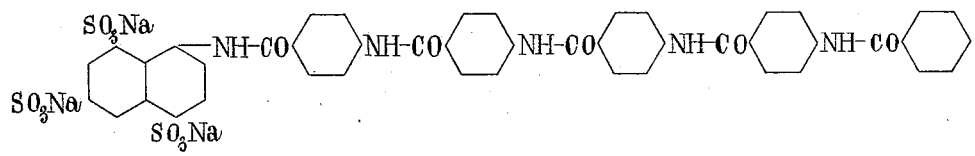
Figure 2 represents the product obtained by repeating for a number of times the condensation of 1-naphthylamine-4.6.8-trisulphonic acid with para-nitro-benzoyl-chloride and subsequent reduction after which the resulting compound is condensed with benzoyl chloride.

We have found that it is an advantage to increase the length of the chain in this way and the product thus prepared and having a formula such as may be represented by that shewn in Figure 2 we regard as of special value.

According to the present invention we may use as sulphonated arylamines, sulphonated amines of the benzene, naphthalene and acenaphthene series, including their hydroxy, chlorine, methyl and other derivatives. For example, among the naphthalene bodies we include naphthylamine-sulphonic acids, di-amino-naphthalene-sulphonic acids, amino-naphthol- and amino-di-hydroxy-naphthalene-sulphonic acids and the like. Among others the following can be used:—1-naphthyl-amino-4.6.8-trisulphonic acid, 1-naphthylamine-3.6.8-trisulphonic acid, 1-amino-8-naphthol-3.6-disulphonic acid, 1-amino-di-hydroxy-naphthalene-sulphonic acid (obtained from 1-amino-8-naphthol-3.6-disulphonic acid according to D. R. P. 75,097, and possibly having the constitution 1-amino-3.6.8-di-hydroxy-naphthalene-sulphonic acid), naphthalene-2-amino-5-hydroxy-7-sulphonic acid, 2.8-amino-naphthol-3.6-di-sulphonic acid, o-toluidine-sulphonic acid, sulphanilic acid, 4-amino-acenaphthene-5-sulphonic acid (see Transactions of the Society of Chemical Industry, 1925, volume 44, page 514 T).

Examples of acid chlorides containing nitro groups are nitro-benzoyl chlorides, nitrotoluyl chlorides, nitro-cinnamyl chlorides, nitro-naphthoyl chlorides and 1.5-nitro-naphthalene sulpho-chlorides. For the terminal groups not containing nitro groups aliphatic acid chlorides such as acetyl chloride may be used or aryl acid chlorides such as benzoyl chloride or sulpho-chlorides such as para-toluene sulpho-chloride or the like.

The isolation and purification of the various intermediates and final products to some extent depends upon their constitution. Thus, a naphthylamine-trisulphonic acid is very soluble in water and almost insoluble in organic solvents.

With a less number of sulphonic acid groups, and with an increasing number of acidyl groups the solubility in water as a rule will decrease while that in organic solvents will increase.

In each condensation there may be some unaltered acidyl chloride remaining as well as some free carboxylic acid or sulphonic acid resulting from the hydrolysis of a portion of the chloride. The unchanged chloride can be removed by filtering immediately after the condensation is complete. The free carboxylic acid can then be separated by making the solution acid to Congo red, so long as the condensation product itself is sufficiently soluble to remain in solution.

When the number of sulphonic acid groups is small, or a large number of acidyl groups have already been introduced it may be difficult to effect a separation in this way.

In these circumstances separation can be done effectively by adding hydrochloric acid until the solution reacts acid to Congo red paper. Salt may also be added if necessary. The three products may then be precipitated together and the pure condensation product is obtained by extracting with an organic solvent.

For extracting benzoyl chlorides and benzoic acids, ether is a convenient solvent.

When the condensation product begins to have substantial solubility in organic solvents the removal of the impurities can be effected so as substantially to avoid loss of the condensation product. This may be done, for example, by extracting with a small quantity of ether and filtering cold.

In some cases where the condensation product has only low solubility it can be crystallized out from the slightly alkaline solution after condensation without the free carboxylic acid itself crystallizing out. The condensation products may be purified by recrystallization from water. As has already been stated in the examples the amount of water used in the condensation can be varied to suit the solubility of the sulphonic acid. When the products are only sparingly soluble in slightly acid solution, the reductions may be carried out in suspension or the product dissolved or suspended in a mixture of water and ethyl alcohol or other suitable organic solvent.

The present invention does not deal with the preparation of ureas, thio-ureas, carbazides or thio-carbazides.

Having now described our invention, what we claim as new and desire to secure by Letters Patent is:—

1. The method which consists in the condensation of 1-naphthylamine-4.6.8-trisulphonic acid with para-nitro-benzoyl-chloride followed by reduction and treatment with benzoyl chloride.

2. The method which consists in the condensation of 1-naphthylamine-4.6.8-trisulphonic acid with para-nitro-benzoyl-chloride followed by reduction, this operation being repeated three times until four benzoyl groups have been introduced after which the resulting compound is condensed with benzoyl chloride.

3. A modification of the method claimed in claim 2 according to which the para-nitro-benzoyl-chloride is used twice and the benzoyl chloride is employed once.

4. Benzoyl-para-amino-benzoyl-para-amino-benzoyl-1-amino-naphthalene-4.6.8-trisulphonic acid.

5. A method for the manufacture of derivatives of the group consisting of the benzene, naphthalene and acenaphthene series which consists in bringing together a sulphonated aromatic amine of that series and a nitro-aromatic-acidyl chloride, reducing the product to the corresponding amine and bringing together this latter amine and an organic acidyl chloride which does not contain a nitro group.

6. A method as claimed in claim 5 in which the reaction between the sulphonated aromatic amine and the nitro-aromatic-acidyl chloride and the reduction of the product is repeated before the resulting amine is brought into contact with the organic acidyl chloride which does not contain a nitro group.

7. A method as claimed in claim 5 in which the reaction between the sulphonated aromatic amine and the nitro-aromatic-acidyl chloride and the reduction of the product is repeated at least twice before the resulting amine is brought into contact with the organic acidyl chloride which does not contain a nitro group.

8. The method which comprises the amino acylation of an amino-dihydroxy-naphthalene sulphonic acid with para-nitro-benzoyl chloride followed by reduction and condensation with benzoyl chloride.

9. The method which comprises the amino acylation of amino-dihydroxy-naphthalene sulphonic acid, such as may be obtained by the alkali fusion of 1.8-amino-naphthol-3.6-disulphonic acid, with para-nitro-benzoyl chloride followed by reduction and condensation with benzoyl chloride.

10. The method which comprises bringing together in an aqueous medium in the presence of an acid absorbing agent, an amino dihydroxy-naphthalene sulphonic acid with para-nitro-benzoyl chloride followed by reduction and amino-benzoylation.

11. The method which comprises bringing together in an aqueous medium in the presence of an acid absorbing agent, an amino-dihydroxy-naphthalene sulphonic acid, such as may be obtained by the alkali fusion of 1.8-amino-naphthol-3.6-disulphonic acid, with para-nitro-benzoyl chloride followed by reduction and amino-benzoylation.

12. The method which comprises bringing together in an aqueous medium in the presence of an acid absorbing agent, an amino-dihydroxy-naphthalene sulphonic acid with para-nitro-benzoyl chloride followed by reduction and condensation with benzoyl chloride.

13. The method which comprises bringing together in an aqueous medium in the presence of an acid absorbing agent, an amino-dihydroxy-naphthalene sulphonic acid, such as may be obtained by the alkali fusion of 1.8-amino-naphthol-3.6-disulphonic acid, with para-nitro-benzoyl chloride followed by reduction and condensation with benzoyl chloride.

14. The method which comprises the amino acylation of an amino-dihydroxy-naphthalene sulphonic acid with a nitro-acidyl-chloride, followed by reduction and condensation with a benzoylating agent.

15. A species of the method claimed in claim 14, in which the condensation with the nitro-acidyl chloride is effected only once.

16. A species of the method claimed in claim 14, in which the condensation with the nitro-acidyl chloride is at least twice repeated.

17. A species of the method claimed in claim 14, in which the nitro-acidyl-chloride is used twice.

In testimony whereof we have signed our names to this specification.

LEONARD JOSEPH HOOLEY.
J. THOMAS.